C. L. LANDON.
TIRE TREAD.
APPLICATION FILED FEB. 20, 1918.
1,384,262.
Patented July 12, 1921.
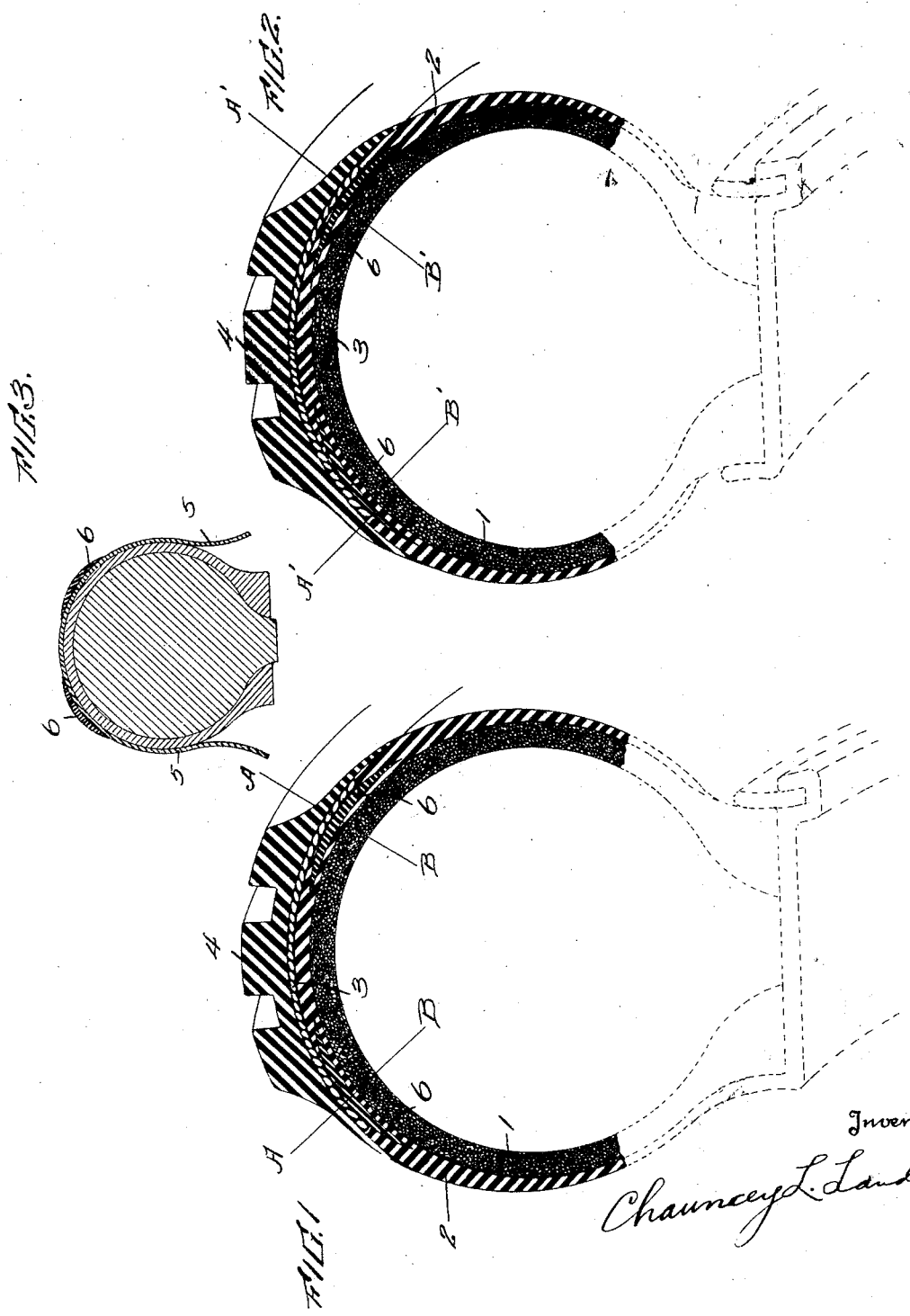

UNITED STATES PATENT OFFICE.

CHAUNCEY L. LANDON, OF AKRON, OHIO, ASSIGNOR TO THE GOODYEAR TIRE & RUBBER COMPANY, OF AKRON, OHIO, A CORPORATION OF OHIO.

TIRE-TREAD.

1,384,262.　　　　Specification of Letters Patent.　　Patented July 12, 1921.

Application filed February 20, 1918. Serial No. 218,249.

*To all whom it may concern:*

Be it known that I, CHAUNCEY L. LANDON, a citizen of the United States, residing at Akron, in the county of Summit and State of Ohio, have invented new and useful Improvements in Tire-Treads, of which the following is a specification.

My present invention relates to pneumatic tires and has for its general object the production of a pneumatic tire wherein the liability of premature destruction through separation of the tread and fabric carcass, is efficiently guarded against.

The prevalent practice in the manufacture of a pneumatic tire involves the essential steps of building the fabric "carcass;" applying the covering strips of rubber, which form the "side walls," "cushion" and "tread" (the "breaker strip" being applied in with the cushion); and curing.

When a pneumatic tire is under load a change in the carcass sectional contour is produced and this changed contour varies constantly in each portion of the tire as bumps, ruts, etc., are encountered and passed over.

One of the results of this change in contour is a shearing action between the tread strip and fabric carcass. The shearing action in a pneumatic tire under load is most acute in the zones which are located at the outer edges of the side walls and include the edges of the breaker strip.

This shearing action between the tread and carcass frequently starts a crack adjacent the edge of the breaker, which gradually results in the failure of the tire through destruction of the union between the tread and carcass.

It is the function of the "cushion" strip in a pneumatic tire to guard against disunion or separation between the tread and carcass by taking up through its elasticity, the shearing action between these elements.

However, while the "cushion" is usually sufficiently elastic to take up by stretching and without rupture, the shearing action between the fabric and the tread in all other portions of the carcass, it very frequently happens that elasticity of the "cushion" is not sufficient to take up, in the zones at the outer portions of the side walls, the shearing action resulting from unusual and sudden distortion when the car is overloaded and an unusually severe shock is sustained.

When such a shock comes, the "cushion" is by the shearing action, stretched in the zone of the "breaker strip" edge beyond its limit of elasticity and a breaking of the union between the tread and carcass occurs. This rupture develops as the tire continues in service and causes tread separation.

As a means for overcoming the foregoing difficulties and rendering the tire less liable to tread separation, I propose by my present invention to adopt the following expedient:

The use, between the cushion and the tread and at the zone of each breaker strip edge, of a rubber insert, which possesses a considerably greater coefficient of elasticity than the cushion itself so that in this zone where shearing produces the maximum stretch, (and consequently maximum strain upon the union), an unusually elastic medium will be present to take up the shear.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a cross section of a pneumatic tire shown more or less in diagrammatic form and illustrating my improved cushion strip under unflexed conditions;

Fig. 2 is a similar view under flexed conditions; and

Fig. 3 is a section of a partially finished tire.

In illustrating my invention, I have shown a tire of a usual type known as the cord tire but it will, of course, be understood that I have shown this type of tire as merely illustrative of the invention, and that my improvement may be applied to almost any tire of the pneumatic type.

In the drawings, numeral 1 designates the carcass proper, 2 the tread cushion and side wall portions, 3 the breaker strip and 4 the tread portion.

After the carcass has been built up in any suitable manner, a gum strip or thin sheet of rubber is applied to the outer surface extending from the valley of one bead to the valley of the other bead. Suitable side wall strips 2 applied either in slab form or in small strips, form the next step in the building and the tire is then ready to receive the cushion strip.

It is here I intend to deviate from the usual practice and instead of applying the usual uniform layer, forming the cushion strip, I substitute a narrow strip 5 of the required thickness (see Fig. 3) along the outer circumferential line, then between the outer edges of the side walls and the strip 5 on each side, a piece of softer or different compounded rubber 6 (preferably of crescent shape) is applied with the flat surface next to the gum strip. Suitable strips of rubber of the same composition as the central strip 5 are then applied over and adjacent to the strip 6 to bring the general contour and thickness of the cushion proper up to a uniform thickness.

The tire is then finished in the usual manner and is ready for commercial use.

To more distinctly illustrate the conditions brought about by flexing a tire, I have shown the lines A—B as appearing on the drawings in Fig. 1 in a connected position and in Fig. 2, where the tire is flexed, the tread portion and breaker strip, being of tough material, do not yield much but only flatten out, the carcass proper being of a unity by itself causes a tendency for the two units to pull against each other. This often causes severe strains at the ends of the breaker strip, which result in a crack starting and the so-called tread separation resulting. It will be readily seen that with the two soft cushion strips applied between the breaker and the carcass, the severe strains are eliminated and a distortion of strip 6 will be of such a degree and nature that the resiliency of the strip 6 will take care of the strain and upon relieving the load, they will resume their normal shape.

What I claim is:

1. In a tire casing, the combination with a tread portion, of a body portion having a plurality of resilient strips of more elastic composition than the tread portion incorporated in the body of the tire, the strips being entirely located in the half of the tire embodying the tread.

2. In a tire of the class described, the combination with a tire carcass, of a tread portion consisting of a tread proper, breaker strip and cushion, and flexible means consisting of a more elastic composition than the cushion, interposed between said carcass and tread portion to flexibly unite them.

3. In a tire of the class described, the combination with a tire carcass of a tread portion consisting of a tread proper, breaker strip and cushion, a plurality of rubber strips, of a softer and more elastic composition than the tread portion or cushion and forming part of the cushion upon vulcanizing, interposed between said carcass and tread portion to flexibly unite them.

4. In a tire of the class described, the combination with a tire carcass of a tread portion consisting of a tread proper, breaker strip and cushion, a plurality of crescent shaped strips of rubber of a more elastic composition than the tread portion interposed between the said carcass and tread portions, with their bases next to the carcass, to flexibly unite them.

5. In a tire of the class described, the combination with a tire carcass of a tread portion consisting of a tread proper, breaker strip and cushion, a plurality of flexible strips of a higher flexibility and elasticity than the rest of the tire, interposed between the said carcass and tread portions at the points of severest flexing strains to flexibly unite them.

6. In a tire casing, the combination with a tire carcass, a breaker strip and cushion, and a tread member, of resilient means interposed between the carcass and the breaker strip for so joining the carcass and the breaker strip as to permit of a substantially greater yielding of the carcass and tread member along the sides of the breaker strip than elsewhere.

In testimony whereof, I have signed my name in the presence of two subscribing witnesses.

CHAUNCEY L. LANDON.

Witnesses:
R. S. TROGNER,
B. J. McDANEL.